US012559000B2

(12) United States Patent
Lee et al.

(10) Patent No.: US 12,559,000 B2
(45) Date of Patent: Feb. 24, 2026

(54) HEIGHT ADJUSTMENT DEVICE AND SWIVEL DEVICE FOR VEHICLE SEAT

(71) Applicants: Hyundai Motor Company, Seoul (KR); Kia Corporation, Seoul (KR); DAS CO., LTD, Gyeongsangbuk-do (KR)

(72) Inventors: Ki Ryung Lee, Gyeonggi-do (KR); Sang Uk Yu, Seoul (KR); Ji Hwan Kim, Seoul (KR); So Young Yoo, Gyeonggi-do (KR); Sang Ho Kim, Incheon (KR); Byung Yong Choi, Gyeonggi-do (KR); Dong Woo Kim, Seoul (KR); Young Joon Kim, Gyeonggi-do (KR); Jae Ho Kim, Gyeonggi-do (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 252 days.

(21) Appl. No.: 18/243,217

(22) Filed: Sep. 7, 2023

(65) Prior Publication Data

US 2024/0343169 A1 Oct. 17, 2024

(30) Foreign Application Priority Data

Apr. 11, 2023 (KR) ........................ 10-2023-0047486

(51) Int. Cl.
　　B60N 2/00 (2006.01)
　　B60N 2/02 (2006.01)
　　(Continued)

(52) U.S. Cl.
　　CPC ........... B60N 2/14 (2013.01); B60N 2/02246 (2023.08); B60N 2/164 (2013.01); B60N 2/02253 (2023.08)

(58) Field of Classification Search
None
See application file for complete search history.

(56) References Cited

U.S. PATENT DOCUMENTS 3,845,926 A * 11/1974 Wahls .................... B60N 2/163
　　　　　　　　　　　　　　　　　　　　248/162.1
4,072,287 A * 2/1978 Swenson ................ B60N 2/508
　　　　　　　　　　　　　　　　　　　　248/588

(Continued)

FOREIGN PATENT DOCUMENTS

KR 　　 10-2475848 B1 　 12/2022
KR 　　 10-2530200 B1 　 5/2023
(Continued)

*Primary Examiner* — Steven M Marsh
(74) *Attorney, Agent, or Firm* — Fox Rothschild LLP

(57) ABSTRACT

A height adjustment device and a swivel device for a vehicle seat are configured to adjust seat height and swivel the vehicle seat. The height adjustment device includes a first reduction gear device disposed at a bottom of the vehicle seat and configured to increase output torque of a first motor and a lifting device engaged with the first reduction gear device and configured to move the seat upwards or downwards, and the swivel device includes a motor driving unit disposed at a bottom of the height adjustment device and a second reduction gear device configured to increase output torque of the motor driving unit, thereby making it possible not only to selectively perform seat height adjustment and swivel operation, but also to perform a monopost function of the seat in a state in which the height adjustment device and the swivel device are stacked in a vertical direction.

20 Claims, 15 Drawing Sheets

(51) Int. Cl.
B60N 2/14 (2006.01)
B60N 2/16 (2006.01)

(56) References Cited

U.S. PATENT DOCUMENTS

| | | | | |
|---|---|---|---|---|
| 4,125,242 | A * | 11/1978 | Meiller ................. | B60N 2/544 |
| | | | | 248/525 |
| 6,705,238 | B1 * | 3/2004 | Heckert ................. | B66F 7/065 |
| | | | | 248/421 |
| 7,108,325 | B2 | 9/2006 | Williamson et al. | |
| 7,364,234 | B2 | 4/2008 | Begin et al. | |
| 7,575,206 | B2 * | 8/2009 | Meier ................. | B60N 2/1665 |
| | | | | 248/161 |
| 7,735,917 | B2 | 6/2010 | Jones et al. | |
| 8,413,942 | B2 * | 4/2013 | Ward ................... | B60N 2/501 |
| | | | | 248/419 |
| 8,783,772 | B2 * | 7/2014 | Schuler ................. | B60N 2/505 |
| | | | | 297/344.15 |
| 8,998,163 | B2 * | 4/2015 | Haller ................... | B60N 2/505 |
| | | | | 267/140.11 |
| 9,242,581 | B2 | 1/2016 | Farooq et al. | |
| 10,336,215 | B2 | 7/2019 | Sowinski et al. | |
| 10,807,505 | B1 * | 10/2020 | Hosbach ................ | B60N 2/164 |
| 2014/0263933 | A1 * | 9/2014 | Bauman ................. | B63B 29/00 |
| | | | | 248/636 |
| 2015/0283928 | A1 * | 10/2015 | Bauman ................ | B60N 2/525 |
| | | | | 248/636 |
| 2020/0001748 | A1 * | 1/2020 | Antoniuk ........... | B60N 2/02258 |
| 2020/0223379 | A1 | 7/2020 | Kikkawa | |
| 2021/0170921 | A1 | 6/2021 | Seibold et al. | |
| 2022/0161694 | A1 | 5/2022 | Numajiri et al. | |
| 2023/0173955 | A1 * | 6/2023 | Jeong ...................... | B60N 2/06 |

FOREIGN PATENT DOCUMENTS

| | | | |
|---|---|---|---|
| WO | 2012/134448 | A1 | 10/2012 |
| WO | 2020/109626 | A1 | 6/2020 |

* cited by examiner

HEIGHT ADJUSTMENT DEVICE AND SWIVEL DEVICE FOR VEHICLE SEAT

CROSS-REFERENCE TO RELATED APPLICATION

This application claims under 35 U.S.C. § 119(a) the benefit of Korean Patent Application No. 10-2023-0047486, filed on Apr. 11, 2023, the entire contents of which are incorporated herein by reference.

BACKGROUND

(a) Technical Field

The present disclosure relates to a height adjustment device and a swivel device for a vehicle seat, more particularly, to the height adjustment device and the swivel device for the vehicle seat configured to perform a monopost function of the vehicle seat, and also to adjust seat height and swivel the vehicle seat.

(b) Description of the Related Art

In conjunction with autonomous or semi-autonomous vehicles, a seat is being developed with various mechanisms to enable conversation and meeting between occupants, relaxation and sleeping, assistance in entering and exiting the vehicle, etc.

For example, a swivel seat may allow rotation of a vehicle seat in a desired direction in order to support multi-party meetings and conversations, external scenery viewing, relaxation and sleeping, assistance in entering and exiting the vehicle, and the like. Further, a height adjustment device has been developed to reliably adjust a height of the vehicle seat.

Generally, a swivel seat refers to a seat having a swivel device installed at a bottom of the seat and configured to perform a predetermined mechanical function.

However, an existing swivel device has a disadvantage in that it is installed at the bottom of the seat in a state in which a swivel structure and a driving unit are separated from each other, and the same is designed to evenly distribute a passenger load, which may result in an excessive increase in volume and packaging area of the swivel device.

Furthermore, in addition to the above-described existing swivel device, if the height adjustment device configured to adjust the height of the seat is additionally installed at the bottom of the seat, the volume and packaging area are excessively increased, and an available area for a floor panel in the vehicle interior corresponding to the bottom of the seat is reduced, which leads to space limitations. Accordingly, various convenience devices having different functions, such as a mobile console, may not be further installed on the floor panel in the vehicle interior.

Meanwhile, in the case of electric vehicles, since a battery module is installed at the bottom of a floor panel, the height of the floor panel increases as much as the height of the battery module. Accordingly, a seat supported by a monopost is applied in the vehicle interior in order to solve space and height restrictions of the floor panel for seat installation.

The monopost couples the bottom of a slim seat to the floor panel so as to support a seat load and a passenger load, and the same provides advantages such as flattening the floor panel and increasing the available area of the floor panel.

However, since the existing monopost coupling the bottom of the seat to the floor panel is too small in volume and cross-sectional area, additional devices such as a seat swivel device and a seat height adjustment device may not be installed on the existing monopost.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a height adjustment device and a swivel device for a vehicle seat, respectively configured to adjust the seat height and swivel the seat. The height adjustment device includes a first reduction gear device disposed at the bottom of the seat and configured to increase output torque of a first motor and a lifting device engaged with the first reduction gear device and configured to move the seat upwards or downwards, and the swivel device includes a motor driving unit disposed at the bottom of the height adjustment device and a second reduction gear device configured to increase output torque of the motor driving unit, thereby making it possible not only to selectively perform seat height adjustment and swivel operation, but also to perform a monopost function of the seat in a state in which the height adjustment device and the swivel device are stacked in the vertical direction.

In one aspect, the present disclosure provides a height adjustment device and a swivel device for a vehicle seat, the height adjustment device and the swivel device including a fixed housing, a lifting plate stacked on the fixed housing so as to be movable upwards and downwards and coupled to a seat cushion frame, a lifting device mounted on the fixed housing and the lifting plate and configured to move the lifting plate upwards and downwards, a first motor mounted in the fixed housing, a first reduction gear device mounted between the first motor and the lifting device and configured to move the lifting device upwards and downwards, and the swivel device mounted between a bottom of the fixed housing and a seat track and configured to swivel the seat.

In a preferred embodiment, the first reduction gear device may include a first worm coupled to an output shaft of the first motor, and a first worm wheel mounted on an outer diameter surface of a lead nut of the lifting device and engaged with the first worm.

In another preferred embodiment, the lifting device may include a lead nut disposed in the fixed housing so as to be rotatable in place, a lead bolt having an upper end coupled to the lifting plate, wherein the lead bolt may be inserted into and coupled to the lead nut so as to be movable upwards and downwards, and a plurality of guide bars coupled to a lower surface of the lifting plate and inserted into the fixed housing so as to be movable upwards and downwards.

In still another preferred embodiment, the fixed housing may have an opening hole disposed at a central portion of the fixed housing and configured to allow the lead bolt to move therethrough upwards and downwards, and the fixed housing may have a plurality of guide holes disposed at an outer circumferential position of the opening hole of the fixed housing, wherein the guide holes may have the guide bars respectively inserted thereinto and configured to be movable upwards and downwards therethrough.

In yet another preferred embodiment, a first bearing may be mounted between an upper outer diameter surface of the lead nut and an inner diameter portion of the fixed housing, wherein the first bearing may guide rotation of the lead nut in place, and a second bearing may be mounted between a lower outer diameter surface of the lead nut and an inner diameter portion of the fixed housing, wherein the second bearing may guide rotation of the lead nut in place.

In still yet another preferred embodiment, the swivel device may include a lower housing, an upper housing stacked on and assembled to the lower housing, an eccentric shaft rotatably disposed at a central portion of the lower housing and the upper housing, a motor driving unit mounted between the lower housing and the eccentric shaft, a second reduction gear device installed between the upper housing and the eccentric shaft, and a swivel plate having a lower portion rotatably mounted on an output part of the second reduction gear device and an upper portion coupled to the fixed housing.

In a further preferred embodiment, the eccentric shaft may include a cylindrical body having a hollow structure, wherein the cylindrical body may allow a lead bolt of the lifting device to be inserted thereinto when the lead bolt moves downwards, a circular part formed at an uppermost end of the cylindrical body, a first eccentric part formed to be integrated with an outer diameter portion of the cylindrical body and located below the circular part, and a second eccentric part formed to be integrated with the outer diameter portion of the cylindrical body and located below the first eccentric part.

In another further preferred embodiment, the first eccentric part may have a first sleeve bearing inserted into an outer diameter portion of the first eccentric part, the second eccentric part may have a second sleeve bearing inserted into an outer diameter portion of the second eccentric part, and the circular part may have a third sleeve bearing inserted into an outer diameter portion of the circular part.

In still another further preferred embodiment, the motor driving unit may include a second motor mounted in the lower housing, a second worm mounted on an output shaft of the second motor, and a second worm wheel mounted on an outer diameter portion of a lower end of the eccentric shaft and engaged with the second worm.

In yet another further preferred embodiment, the second reduction gear device may include a first external gear inserted into and coupled to a first eccentric part of the eccentric shaft, a second external gear inserted into and coupled to a second eccentric part of the eccentric shaft, and an internal gear formed on an inner diameter portion of the upper housing and engaged with the first external gear and the second external gear.

In still yet another further preferred embodiment, the first external gear inserted into and coupled to the first eccentric part and the second external gear inserted into and coupled to the second eccentric part may be stacked and coupled eccentrically to each other so that a portion of the first external gear, the portion being engaged with the internal gear, and a portion of the second external gear, the portion being engaged with the internal gear, are different from each other.

In a still further preferred embodiment, the first external gear may have a plurality of first coupling holes formed therein, and the second external gear may have a plurality of second coupling holes formed therein, wherein the first coupling holes and the second coupling holes may match each other in a vertical direction, and wherein the first coupling holes and the second coupling holes may have hollow fixation pins respectively inserted thereinto and coupled thereto.

In a yet still further preferred embodiment, the hollow fixation pins may have rotation transmission pins respectively inserted thereinto and coupled thereto, and the rotation transmission pins respectively may have upper ends arranged so as to protrude upwards from the first external gear.

In a yet preferred embodiment, the upper housing may have a ring-shaped support plate mounted on a lower surface of the upper housing and configured to support a bottom of the second external gear, and a second ball bearing may be mounted between an outer diameter portion of the eccentric shaft and an inner diameter portion of the support plate, wherein the second ball bearing may guide rotation of the eccentric shaft.

In a yet further preferred embodiment, the swivel plate may have a rotation transmission groove formed on a lower surface of the swivel plate and configured to allow an upper end of a rotation transmission pin to be inserted thereinto and coupled thereto, wherein the rotation transmission pin may be formed to protrude upwards from a first external gear of the reduction gear device.

In yet another further preferred embodiment, the swivel plate may have a lower cover mounted on the lower surface of an edge portion of the swivel plate and configured to rotatably contact an upper surface of the upper housing, and a first ball bearing may be mounted between inner diameter portions of the swivel plate and the lower cover and an outer diameter portion of the upper housing, wherein the first ball bearing may guide rotation of the swivel plate and rotation of the lower cover.

In another aspect, the present disclosure provides a height adjustment device and a swivel device for a vehicle seat, the height adjustment device and the swivel device including a fixed housing, a lifting plate stacked on the fixed housing so as to be movable upwards and downwards and coupled to a seat cushion frame, a lifting device mounted on the fixed housing and the lifting plate and configured to move the lifting plate upwards and downwards, a first motor mounted in the fixed housing, and a first reduction gear device mounted between the first motor and the lifting device and configured to move the lifting device upwards and downwards. The swivel device configured to swivel the seat may be selectively further mounted between a bottom of the fixed housing and a seat track.

In a further aspect, a vehicle comprises the height adjustment device and the swivel device.

In additional aspects, vehicles are provided that comprise a seat and seat assembly as disclosed herein.

In further aspects, vehicles are provided that comprise a vehicle seat that includes a power swivel apparatus as disclosed herein.

In further aspects, vehicles are provided that comprise a power swivel apparatus as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a monopost seat assembly or monopost seat or other similar term refers to a captain's-type vehicle seat rather than a bench-type vehicle seat or seat assembly.

In certain aspects, a monopost vehicle seat may not have a seat-collapsing hinge as provided with a bench-type vehicle seat.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 14 is a cross-sectional view showing a state in which the height adjustment device and the swivel device for the

Figure 15:
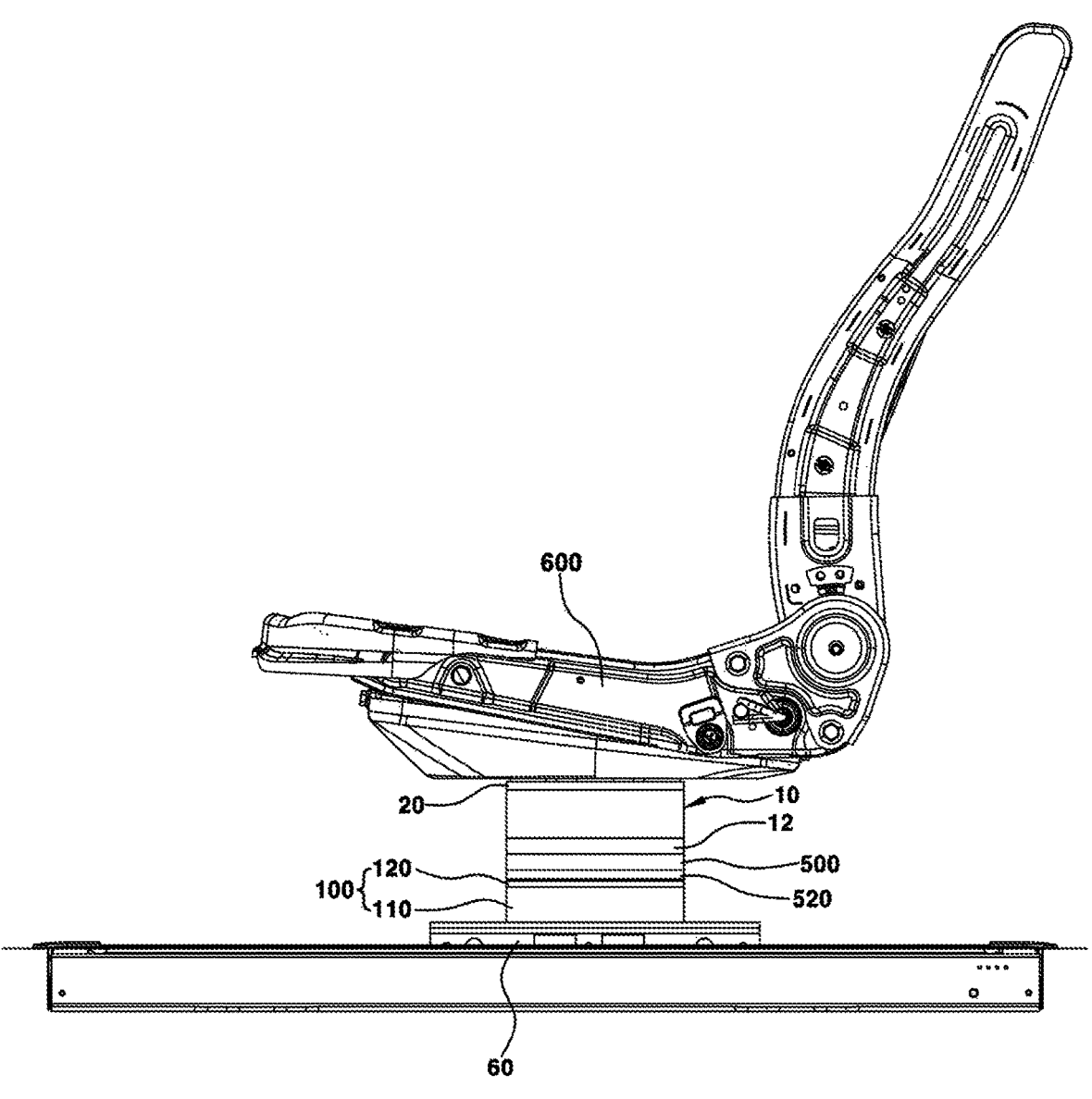

6 vehicle seat according to the present disclosure are stacked and assembled to each other; and FIG. 15 is a side view showing a state in which the height adjustment device and the swivel device for the vehicle seat according to the present disclosure are mounted on the bottom of the seat cushion frame in the form of a monopost.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, preferred embodiments of the present disclosure will be described in detail with reference to the accompanying drawings.

Figure 1:
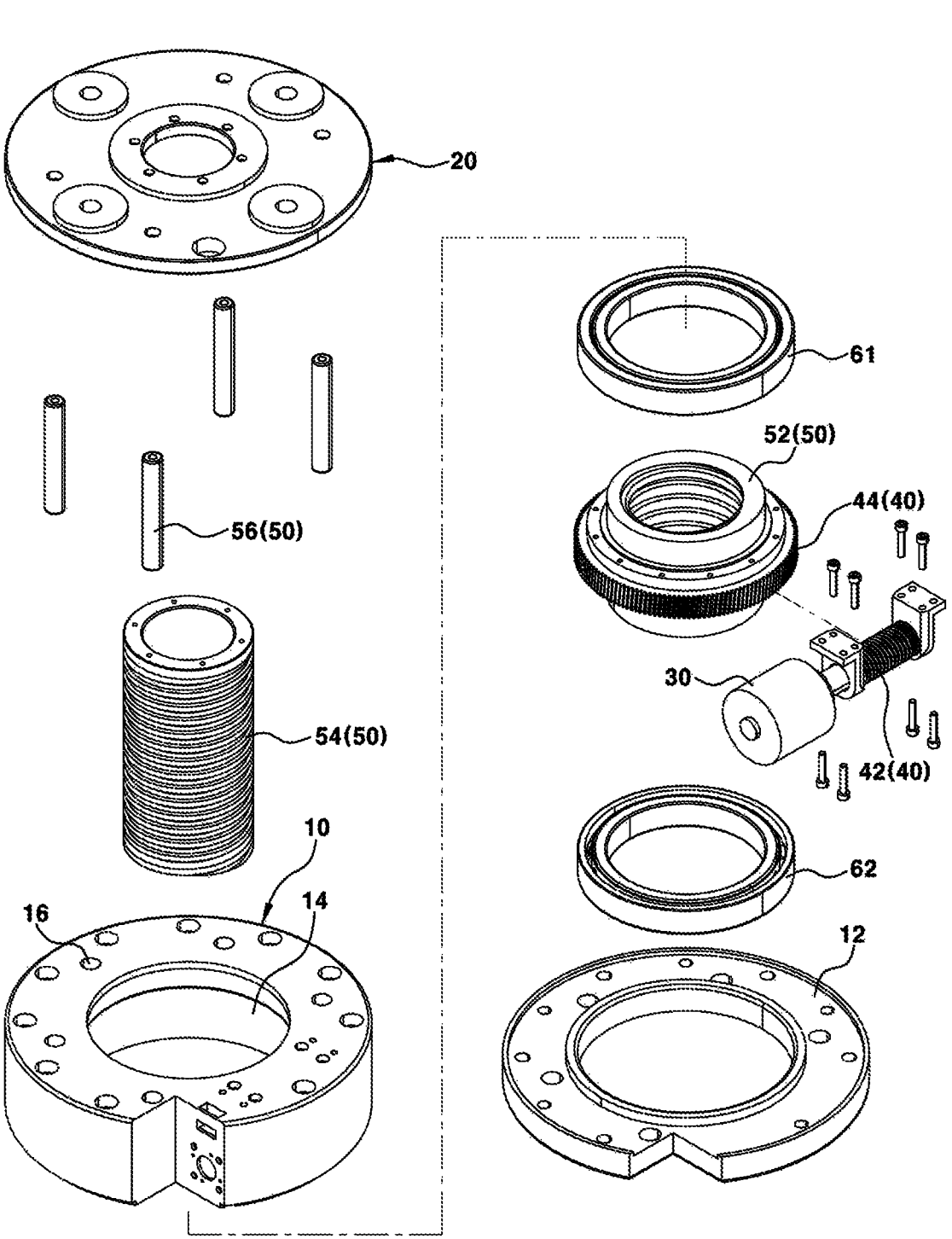
FIG. 1 is an exploded perspective view showing a height adjustment device for a vehicle seat according to the present disclosure.
Figure 2:
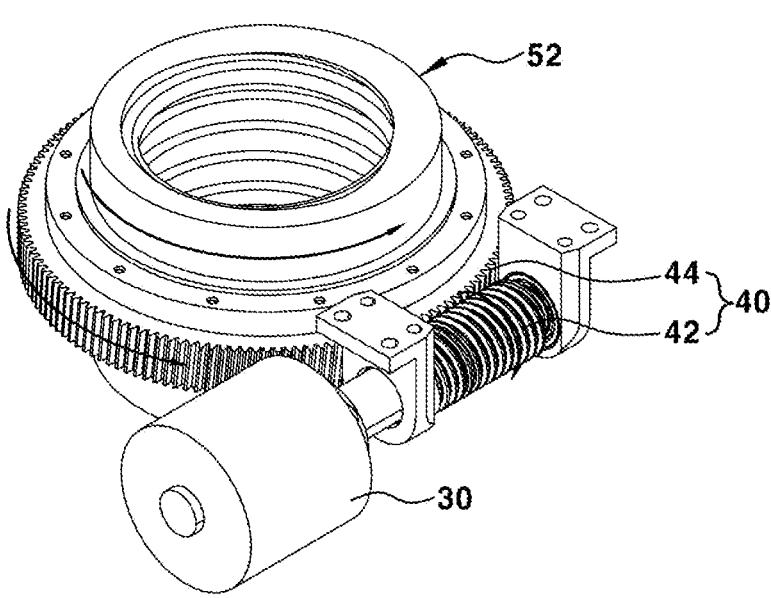
FIG. 2 is a perspective view showing a first motor and a first reduction gear device of the height adjustment device for the vehicle seat according to the present disclosure.
Figure 3:
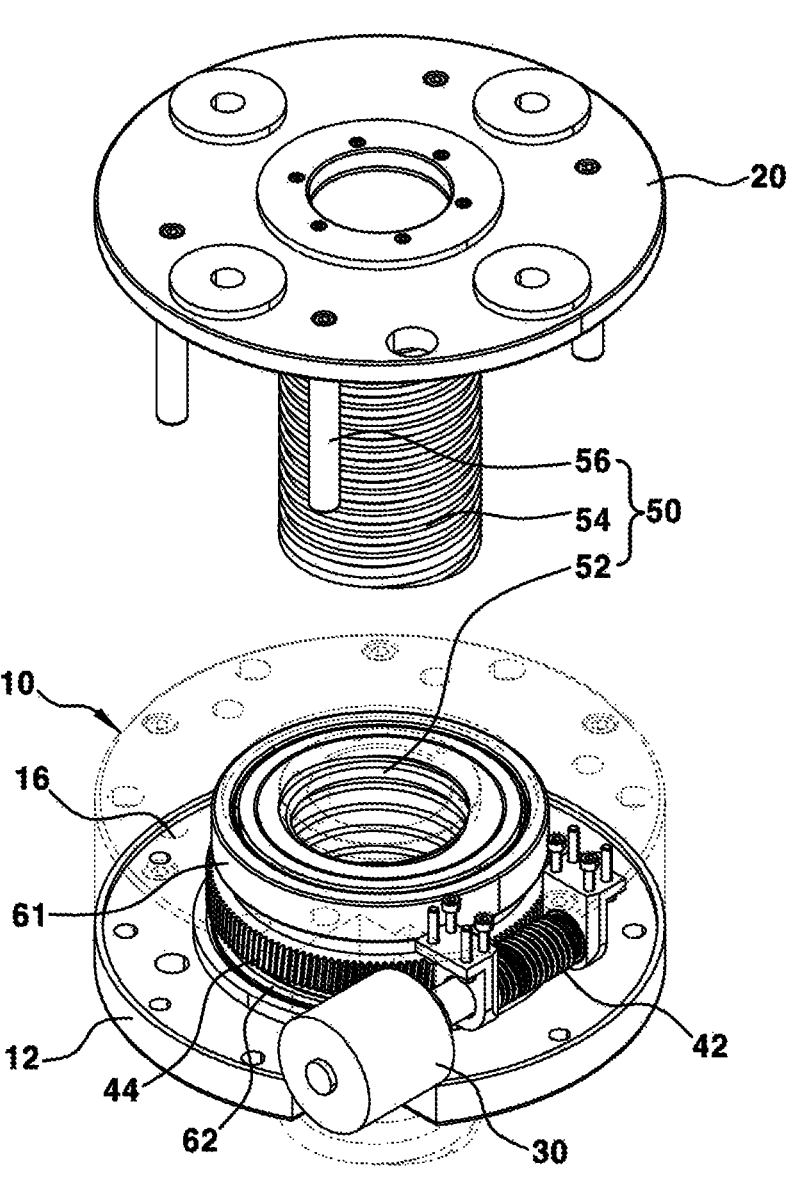
FIG. 3 is a perspective view showing a lifting device of the height adjustment device for the vehicle seat according to the present disclosure.

FIGS. 1, 2, and 3 show a height adjustment device for a vehicle seat according to the present disclosure, and reference numeral 10 in each drawing represents a fixed housing.

The fixed housing 10 is located at the bottom of a seat cushion to perform a monopost function, and the same has a structure in which components configured to adjust the height of the seat are installed therein.

To this end, the fixed housing 10 has an opening hole 14 formed to vertically pass through a central portion of the fixed housing 10 and configured to move a lead bolt 54 of a lifting device 50 upwards and downwards, and the inside of the fixed housing 10 has a cylindrical structure for installation of components for height adjustment.

In addition, a plurality of guide holes 16 having guide bars 56 of the lifting device 50 respectively inserted thereinto are formed at the outer circumferential position of the opening hole 14 of the fixed housing 10. Here, the guide bars 56 are respectively inserted to the plurality of guide holes 16 so as to be movable upwards and downwards.

Preferably, a cover plate 12 is detachably mounted on the bottom of the fixed housing 10 in order to easily install the components for height adjustment in the fixed housing 10.

A lifting plate 20 coupled to a seat cushion frame 600 is stacked on the fixed housing 10 so as to be movable upwards and downwards. As described in detail below, when the lifting plate 20 moves upwards and downwards, the seat cushion frame 600 also moves upwards or downwards, thereby making it possible to adjust the height of the seat.

In order to perform vertical motion of the lifting plate 20, the lifting device 50 is mounted on the fixed housing 10 and the lifting plate 20.

As shown in FIG. 3, the lifting device 50 includes a lead nut 52 disposed in the fixed housing 10 so as to be rotatable in place, the lead bolt 54 inserted into and coupled to the lead nut 52 so as to be movable upwards and downwards, the lead bolt 54 having an upper end coupled to the lifting plate 20, and the plurality of guide bars 56 coupled to the lower surface of the lifting plate 20 and inserted into the fixed housing 10 so as to be movable upwards and downwards.

The lead nut 52 has a female screw portion formed on the inner diameter portion of the lead nut 52 and is disposed in the fixed housing 10 so as to be rotatable in place.

The lead bolt 54 has a male screw portion formed on the outer diameter portion of the lead bolt 54 and is screwed with the female screw portion of the lead nut 52. The lead bolt 54 has an upper end coupled to the lifting plate 20.

The guide bars 56 guide the lifting plate 20 so that upward movement and downward movement of the lifting plate 20 become rectilinear motion. Further, the guide bars 56 are coupled to the lower surface of the lifting plate 20 and are respectively inserted into the guide holes 16 of the fixed housing 10 so as to be movable upwards and downwards.

Therefore, when the lead nut 52 rotates in place, the lead bolt 54 may be raised or lowered by the rectilinear guidance of the guide bars 56. Simultaneously, the lifting plate 20 coupled to the upper end of the lead bolt 54 may also be raised or lowered integrally with the lead bolt 54, and the seat cushion frame 600 coupled to the lifting plate 20 may also be raised or lowered, thereby reliably adjusting the height of the seat.

The fixed housing 10 has a first motor 30 mounted therein and configured to serve as a driving source to drive the lifting device, that is, as a driving source to rotate the lead nut 52 in place, and a first reduction gear device 40 is mounted between the first motor 30 and the lifting device 50.

As shown in FIG. 2, the first reduction gear device 40 includes a first worm 42 coupled to an output shaft of the first motor 30 and a first worm wheel 44 mounted on the outer diameter surface of the lead nut 52 of the lifting device 50 and engaged with the first worm 42.

Preferably, the first worm wheel 44 is mounted in the middle portion of the outer diameter of the lead nut 52 in the vertical direction.

Accordingly, when the first worm 42 is rotated according to driving of the first motor 30, rotational force of the first worm 42 is transmitted to the first worm wheel 44, and the lead nut 52 may be rotated in place.

Figure 5:
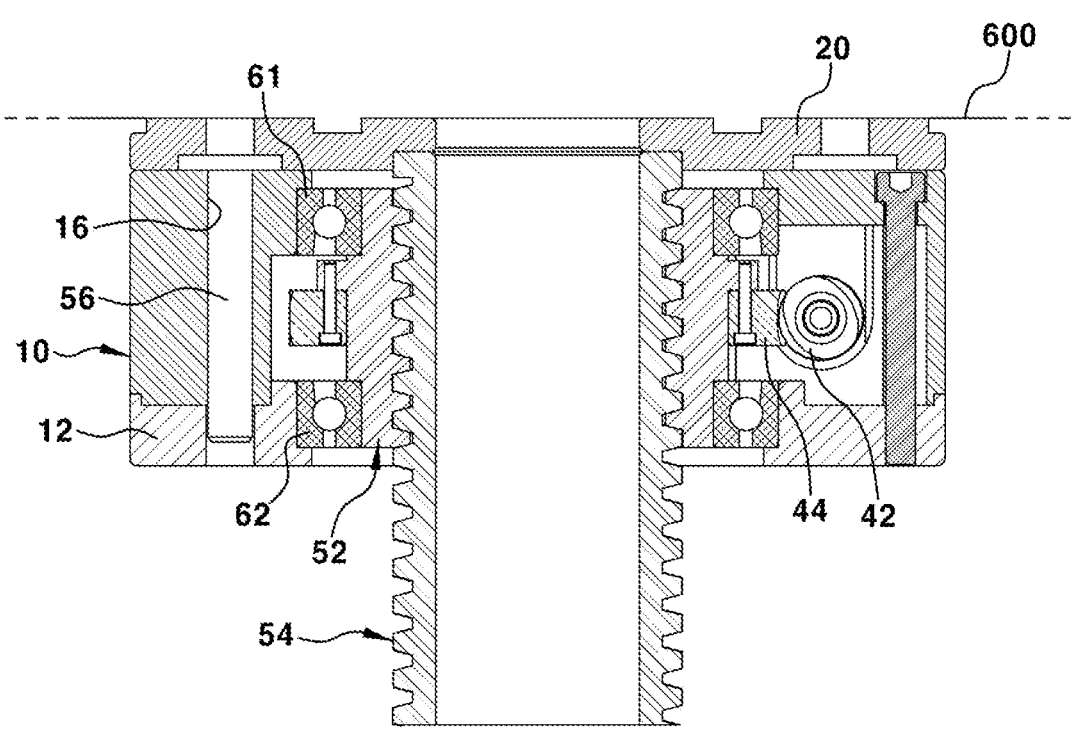
FIG. 5 is a cross-sectional view showing the state in which the lifting plate of the height adjustment device for the vehicle seat according to the present disclosure is lowered.
Figure 7:
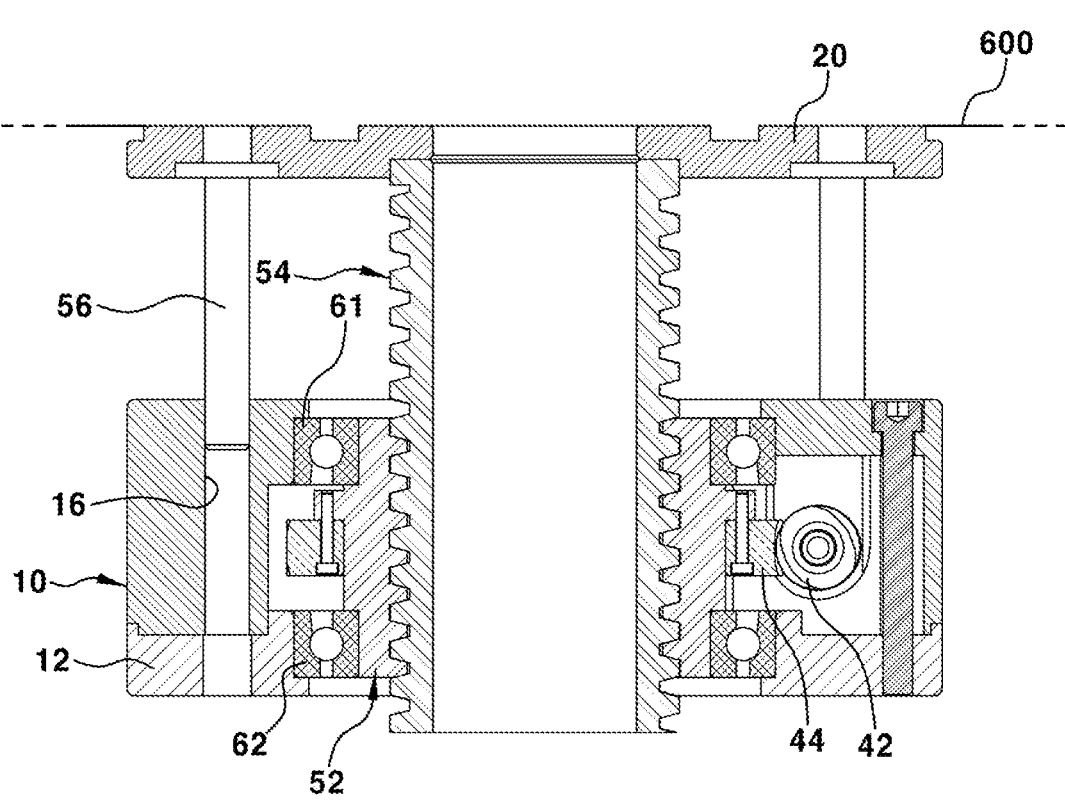
FIG. 7 is a cross-sectional view showing the state in which the lifting plate of the height adjustment device for the vehicle seat according to the present disclosure is raised.

Meanwhile, in order to enable the lead nut 52 to be reliably rotated in place, as shown in FIGS. 5 and 7, a first bearing 61 configured to guide rotation of the lead nut 52 in place is mounted between the upper outer diameter surface of the lead nut 52 and the inner diameter portion of the fixed housing 10, and a second bearing 62 configured to guide rotation of the lead nut 52 in place is mounted between the lower outer diameter surface of the lead nut 52 and the inner diameter portion of the fixed housing 10.

Here, an operation flow of the height adjustment device of the present disclosure having the above-described configuration will be described as follows.

Figure 4:
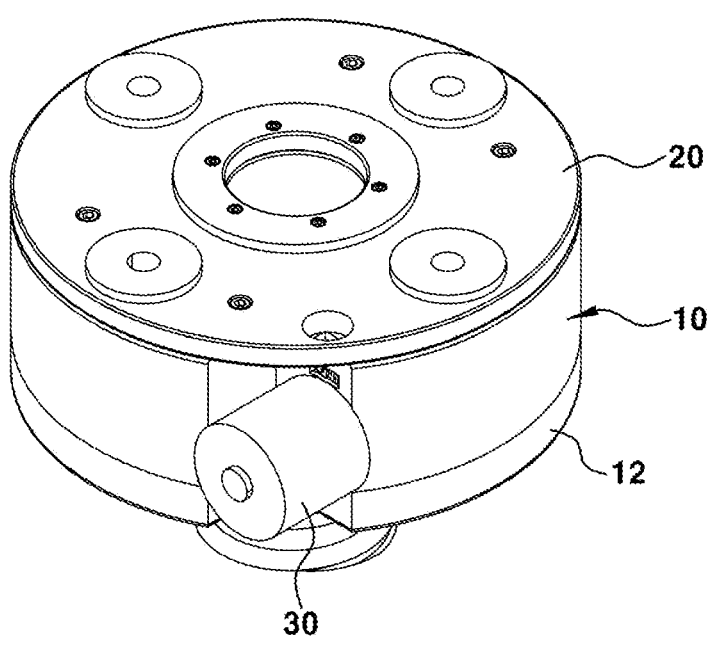
FIG. 4 is a perspective view showing a state in which a lifting plate of the height adjustment device for the vehicle seat according to the present disclosure is lowered.
Figure 6:
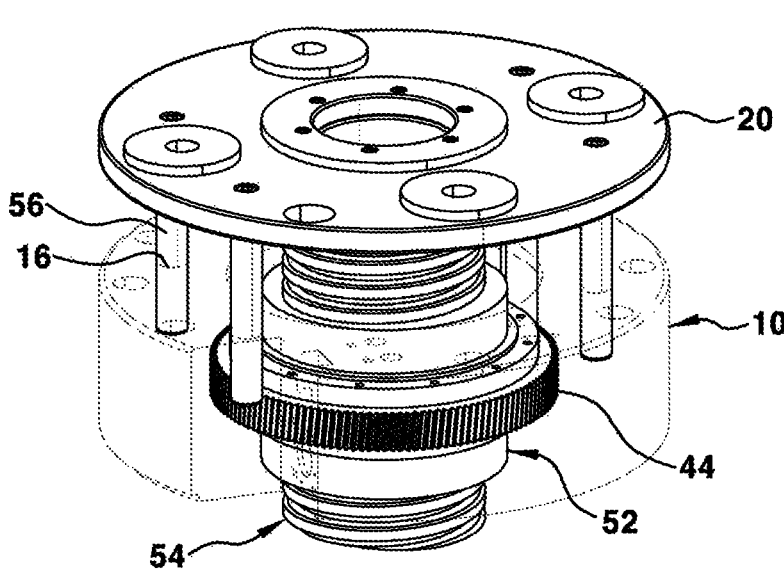
FIG. 6 is a perspective view showing a state in which the lifting plate of the height adjustment device for the vehicle seat according to the present disclosure is raised.

FIGS. 4 and 5 show a state in which the lifting plate of the height adjustment device for the vehicle seat according to the present disclosure is lowered, and FIGS. 6 and 7 show a state in which the lifting plate of the height adjustment device for the vehicle seat according to the present disclosure is raised.

When the first worm 42 is rotated in one direction according to driving of the first motor 30, rotational force of the first worm 42 is transmitted to the first worm wheel 44, thereby enabling the lead nut 52 to be rotated in place in one direction.

In this case, when rotational force and output torque of the first motor 30 are transmitted from the first worm 42 to the first worm wheel 44, rotational speed of the first motor 30 may be reduced, and output torque of the first motor 30 may be increased.

Subsequently, when the lead nut 52 is rotated in place in one direction, as shown in FIGS. 6 and 7, the lead bolt 54 may be raised from the inside of the lead nut 52 by rectilinear guidance of the guide bars 56, and the lifting plate 20 coupled to the upper end of the lead bolt 54 may also be raised with the lead bolt 54.

Subsequently, when the lifting plate 20 is raised, the seat cushion frame 600 coupled to the lifting plate 20 is pushed upwards, thereby making it possible to adjust the height of the seat in the upward direction.

On the other hand, when the first worm 42 is rotated in the other direction according to driving of the first motor 30, rotational force of the first worm 42 is transmitted to the first worm wheel 44, thereby enabling the lead nut 52 to be rotated in place in the other direction.

Subsequently, when the lead nut 52 is rotated in place in the other direction, as shown in FIGS. 4 and 5, the lead bolt 54 may be lowered into the inside of the lead nut 52 by rectilinear guidance of the guide bars 56, and the lifting plate 20 coupled to the upper end of the lead bolt 54 may also be lowered with the lead bolt 54.

Subsequently, when the lifting plate 20 is lowered, the seat cushion frame 600 coupled to the lifting plate 20 is also moved downwards, thereby making it possible to adjust the height of the seat in the downward direction.

Meanwhile, according to the present disclosure, a swivel device configured to adjust seat swivel is disposed below the height adjustment device.

That is, the swivel device configured to adjust seat swivel is mounted between the bottom of the fixed housing 10 and a seat track 60.

Here, a configuration of the swivel device according to the present disclosure will be described as follows.

Figure 8:
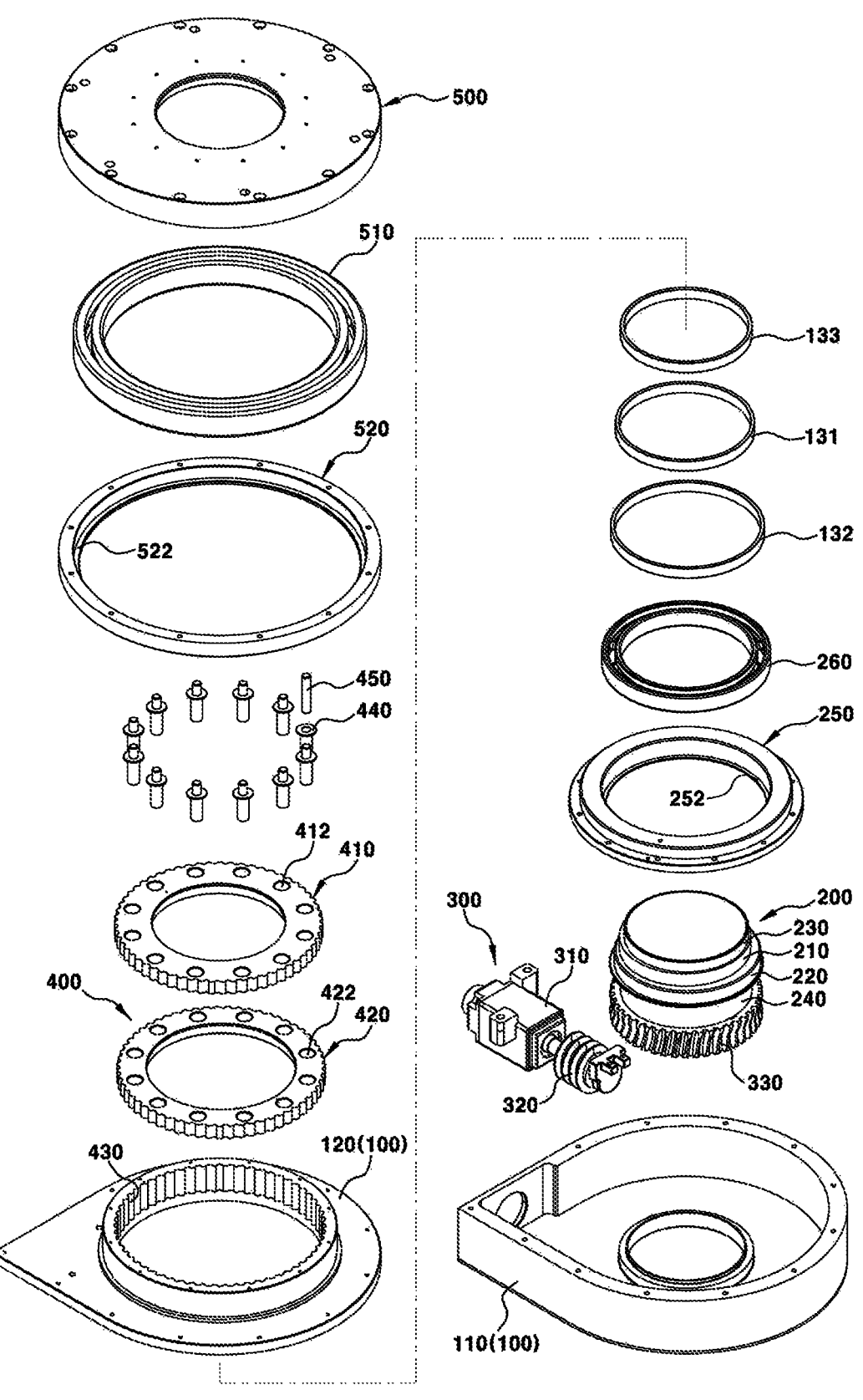
FIG. 8 is an exploded perspective view showing a swivel device for a vehicle seat according to the present disclosure.
Figure 9:
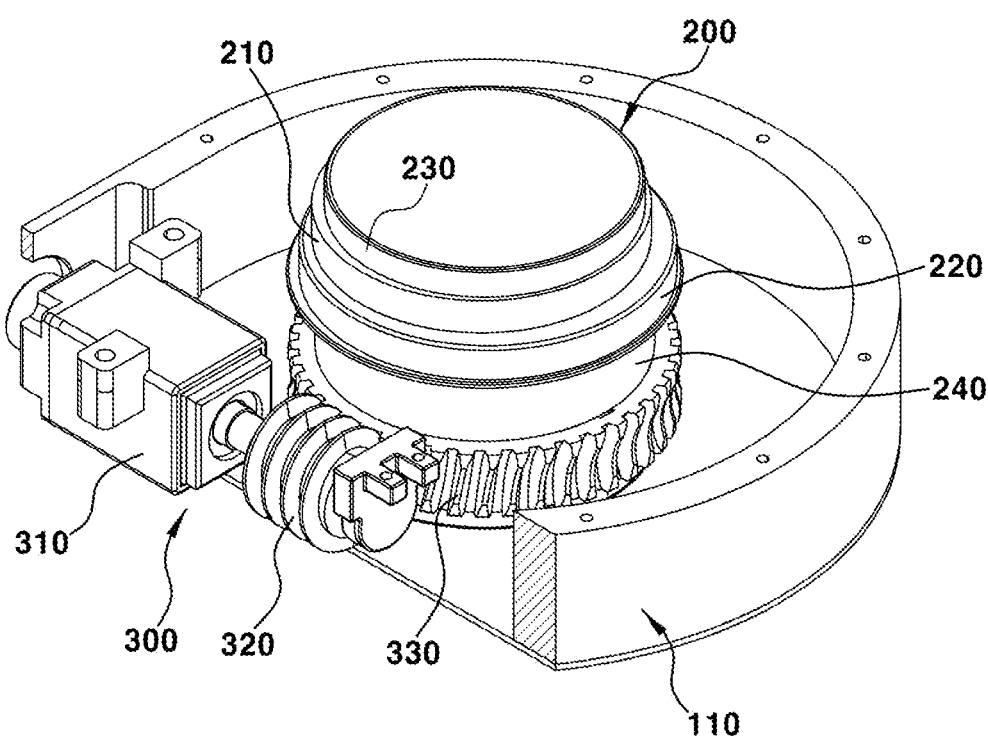
FIG. 9 is an assembled perspective view showing a partial cross-section of a motor driving unit of the swivel device for the vehicle seat according to the present disclosure.
Figure 10:
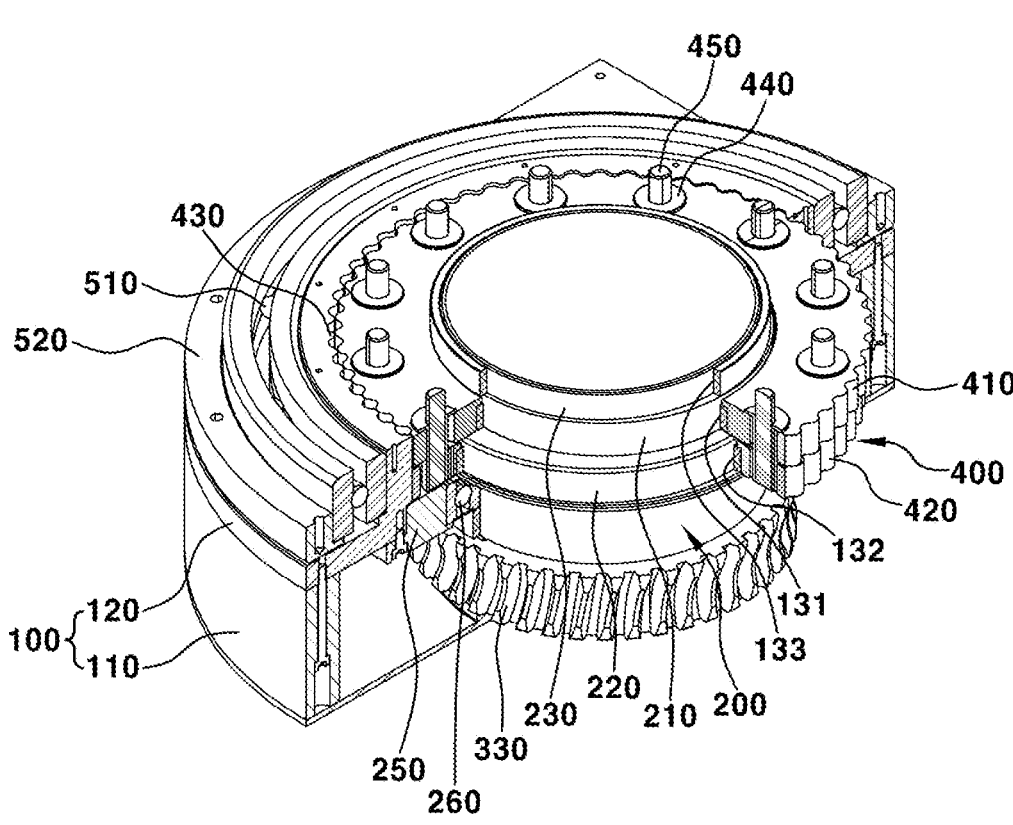
FIG. 10 is an assembled perspective view of a partial cross-section showing a state in which a second reduction gear device is stacked on and assembled to the motor driving unit of the swivel device for the vehicle seat according to the present disclosure.

FIG. 8 is an exploded perspective view showing the swivel device according to the present disclosure, FIG. 9 shows an assembled state of a motor driving unit of the swivel device according to the present disclosure, FIG. 10 shows an assembled state of a second reduction gear device of the swivel device according to the present disclosure, and reference numeral 100 in each drawing represents a housing.

The housing 100 includes a lower housing 110 mounted on an interior floor panel of a vehicle or mounted on the seat track 60 so as to be movable forwards and rearwards, and an upper housing 120 stacked on and coupled to the top of the lower housing 110.

Particularly, an eccentric shaft 200, a motor driving unit 300 configured to transmit power to the eccentric shaft 200, and a second reduction gear device 400 configured to receive power from the eccentric shaft 200 are installed in the lower housing 110 and the upper housing 120.

The eccentric shaft 200 has a cylindrical body 240 rotatably disposed at the center of the lower housing 110 and the upper housing 120 as a skeleton body, and the same has a structure in which a circular part 230, a first eccentric part 210, and a second eccentric part 220 are sequentially formed from the top of the cylindrical body 240.

More specifically, the uppermost end of the cylindrical body 240 forming the skeleton of the eccentric shaft 200 is formed as the circular part 230, the first eccentric part 210 is formed to be integrated with the lower portion of the circular part 230 and is disposed at the outer diameter portion of the upper end of the cylindrical body 240, and the second eccentric part 220 is formed to be integrated with the lower portion of the first eccentric part 210 and is disposed at the outer diameter portion of the upper end of the cylindrical body 240.

Preferably, the outer diameter portion of the circular part 230 is smaller than that of the first eccentric part 210, and the outer diameter portion of the first eccentric part 210 is smaller than that of the second eccentric part 220.

Particularly, the first eccentric part 210 is formed to be eccentric in one direction from the center of the cylindrical body 240 in order to eccentrically rotate a first external gear 410 of the second reduction gear device 400, and the second eccentric part 220 is formed to be eccentric in the other direction from the center of the cylindrical body 240 in order to eccentrically rotate a second external gear 420 of the second reduction gear device 400.

Accordingly, the first eccentric part 210 is formed to be eccentric in one direction from the center of the cylindrical body 240, and the second eccentric part 220 is formed to be eccentric in the other direction from the center of the cylindrical body 240, thereby allowing the first external gear 410 inserted into the first eccentric part 210 and the second external gear 420 inserted into the second eccentric part 220 to be arranged eccentrically.

Preferably, the first eccentric part 210 has a first sleeve bearing 131 inserted into the outer diameter portion of the first eccentric part 210. Here, the first sleeve bearing 131 is in slide contact with the first external gear 410 to transmit eccentric rotational force. The second eccentric part 220 has a second sleeve bearing 132 inserted into the outer diameter portion of the second eccentric part 220. Here, the second sleeve bearing 132 is in slide contact with the second external gear 420 to transmit eccentric rotational force. The circular part 230 has a third sleeve bearing 133 inserted into the outer diameter portion of the circular part 230. Here, the third sleeve bearing 133 is in slide contact with a swivel plate 500.

The motor driving unit 300 may be mounted between the lower housing 110 and the eccentric shaft 200 to rotationally drive the eccentric shaft 200.

To this end, as shown in FIG. 9, the motor driving unit 300 may include a second motor 310 mounted in the lower housing 110, a second worm 320, which is an output gear, mounted on the output shaft of the second motor 310, and a second worm wheel 330 mounted on the lower outer diameter portion of the cylindrical body 240 of the eccentric shaft 200 and engaged with the second worm 320.

Accordingly, rotational force of the second worm 320 according to the driving of the second motor 310 is transmitted to the second worm wheel 330, thereby making it possible to reliably rotate the eccentric shaft 200 having the second worm wheel 330 mounted thereon.

The second reduction gear device 400 may be mounted between the upper housing 120 and the eccentric shaft 200.

To this end, as shown in FIG. 10, the second reduction gear device 400 may include the first external gear 410 inserted into and coupled to the first eccentric part 210 of the eccentric shaft 200, the second external gear 420 inserted into and coupled to the second eccentric part 220 of the eccentric shaft 200, and an internal gear 430 formed on the inner diameter portion of the upper housing 120 and simultaneously engaged with the first external gear 410 and the second external gear 420.

Substantially, the inner diameter portion of the first external gear 410 is in contact with the first sleeve bearing 131 inserted into the outer diameter portion of the first eccentric part 210, and the inner diameter portion of the second external gear 420 is in contact with the second sleeve bearing 132 inserted into the outer diameter portion of the second eccentric part 220.

In this case, the number of teeth of the first external gear 410 and the number of teeth of the second external gear 420 are formed to be smaller than the number of teeth of the internal gear 430, thereby enabling the first external gear 410 and the second external gear 420 to be eccentrically rotated along the internal gear 430.

Figure 11:
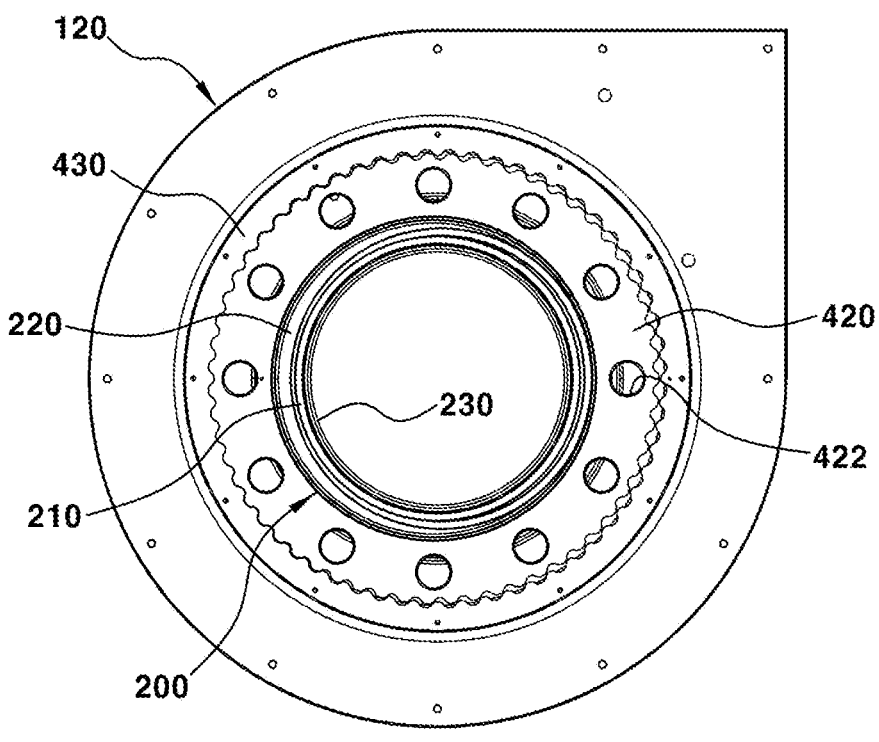
FIG. 11 is a plan view showing a state in which a middle gear is engaged with a lower gear in the configuration of the second reduction gear device of the swivel device for the vehicle seat according to the present disclosure.
Figure 12:
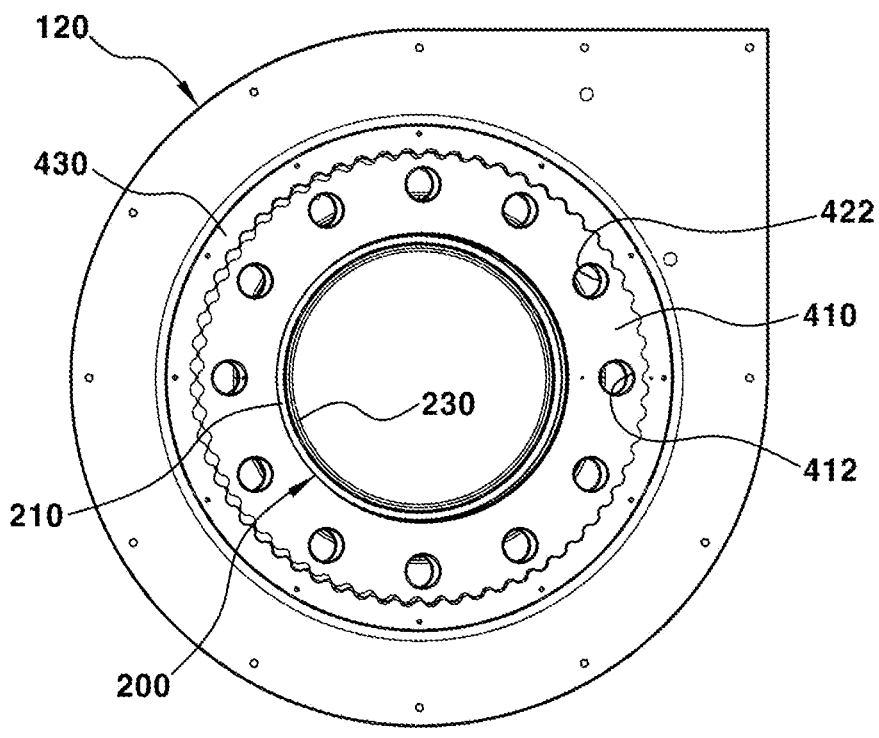
FIG. 12 is a plan view showing a state in which an upper gear is engaged with the middle gear and the lower gear in the configuration of the second reduction gear device of the swivel device for the vehicle seat according to the present disclosure.

To this end, as shown in FIG. 11, the second external gear 420 is first inserted into and coupled to the second eccentric part 220 of the eccentric shaft 200 so as to be eccentrically disposed in one direction, and the same is also eccentrically and rotatably engaged with one part of the internal gear 430. Subsequently, as shown in FIG. 12, the first external gear 410 is inserted into and coupled to the first eccentric part 210 of the eccentric shaft 200 so as to be eccentrically disposed in the other direction, and the same is also eccentrically and rotatably engaged with the other part of the internal gear 430.

In other words, the first eccentric part 210 is formed to be eccentric in one direction from the center of the cylindrical body 240, and the second eccentric part 220 is formed to be eccentric in the other direction from the center of the cylindrical body 240, thereby enabling the first external gear 410 inserted into the first eccentric part 210 and the second external gear 420 inserted into the second eccentric part 220 to be disposed eccentrically to each other. Accordingly, a portion at which the first external gear 410 is engaged with the internal gear 430 and a portion at which the second external gear 420 is engaged with the internal gear 430 may be set to be different from each other.

In this case, the first external gear 410 inserted into and coupled to the first eccentric part 210 and the second external gear 420 inserted into and coupled to the second eccentric part 220 are stacked in the vertical direction while being disposed to be eccentric with each other, and the same are coupled to each other by a hollow fixation pin 440 and a rotation transmission pin 450.

To this end, the first external gear 410 and the second external gear 420 respectively have a plurality of first coupling holes 412 and a plurality of second coupling holes 422 formed at regular intervals in the circumferential direction and formed to match each other so as to communicate with each other in the vertical direction.

Accordingly, in a state in which the first external gear 410 inserted into and coupled to the first eccentric part 210 and the second external gear 420 inserted into and coupled to the second eccentric part 220 are eccentric with each other and are stacked in the vertical direction, the hollow fixation pin 440 is first inserted into and coupled to the first coupling hole 412 and the second coupling hole 422 formed to match each other so as to communicate with each other in the vertical direction, and the first external gear 410 and the second external gear 420 are coupled to each other.

Subsequently, the rotation transmission pin 450 is inserted into and coupled to the hollow fixation pin 440, and the upper end of the rotation transmission pin 450 is disposed to protrude upwards from the first external gear 410. In this manner, the upper end of the rotation transmission pin 450 is coupled to the swivel plate 500 so as to transmit rotational force thereto.

In this case, the upper housing 120 has a ring-shaped support plate 250 disposed on the lower surface of the upper housing 120, configured to support the bottom of the second external gear 420, and spaced apart from the outer diameter portion of the eccentric shaft 200 by a predetermined distance. Accordingly, the ring-shaped support plate 250 has a function of supporting the load of the first external gear 410 and the second external gear 420, thereby preventing the first external gear 410 and the second external gear 420 from deviating in the downward direction.

Particularly, a second ball bearing 260 is mounted between the outer diameter portion of the eccentric shaft 200, that is, the outer diameter portion of the cylindrical body 240 directly below the second eccentric part 220, and the inner diameter portion of the support plate 250. Accordingly, rotation of the eccentric shaft 200 may be smoothly performed by guidance of the second ball bearing 260.

Preferably, the support plate 250 has a second support end 252 formed to be integrated with the bottom inner diameter portion of the support plate 250 and configured to support the bottom of the second ball bearing 260, thereby stably fixing the position of the second ball bearing 260 and preventing the second ball bearing 260 from deviating in the downward direction.

Therefore, when rotational force of the second worm 320 according to the driving of the second motor 310 is transmitted to the second worm wheel 330 and the eccentric shaft 200 is rotated, the first eccentric part 210 and the second eccentric part 220 are eccentrically rotated. At this time, the second external gear 420 is engaged with one part of the internal gear 430 so as to be eccentrically rotated by eccentric rotation of the second eccentric part 220, and the first external gear 410 is engaged with the other part of the internal gear 430 so as to be eccentrically rotated by eccentric rotation of the first eccentric part 210.

Preferably, when the eccentric shaft 200 is rotated once by the driving of the second motor 310, the first external gear 410 may be rotated by 1/the number of teeth of the first external gear, and the second external gear 420 may also be rotated by 1/the number of teeth of the second external gear.

In this manner, when the eccentric shaft 200 is continuously rotated by the driving of the second motor 310, the second external gear 420 is eccentrically rotated while being engaged with one part of the internal gear 430, and simultaneously, the first external gear 410 is eccentrically rotated while being engaged with the other part of the internal gear 430, thereby making it possible not only to reliably increase output torque of the second motor 310 to swivel a vehicle seat, but also to transmit the increased output torque to the swivel plate 500 through the rotation transmission pin 450.

Figure 13:
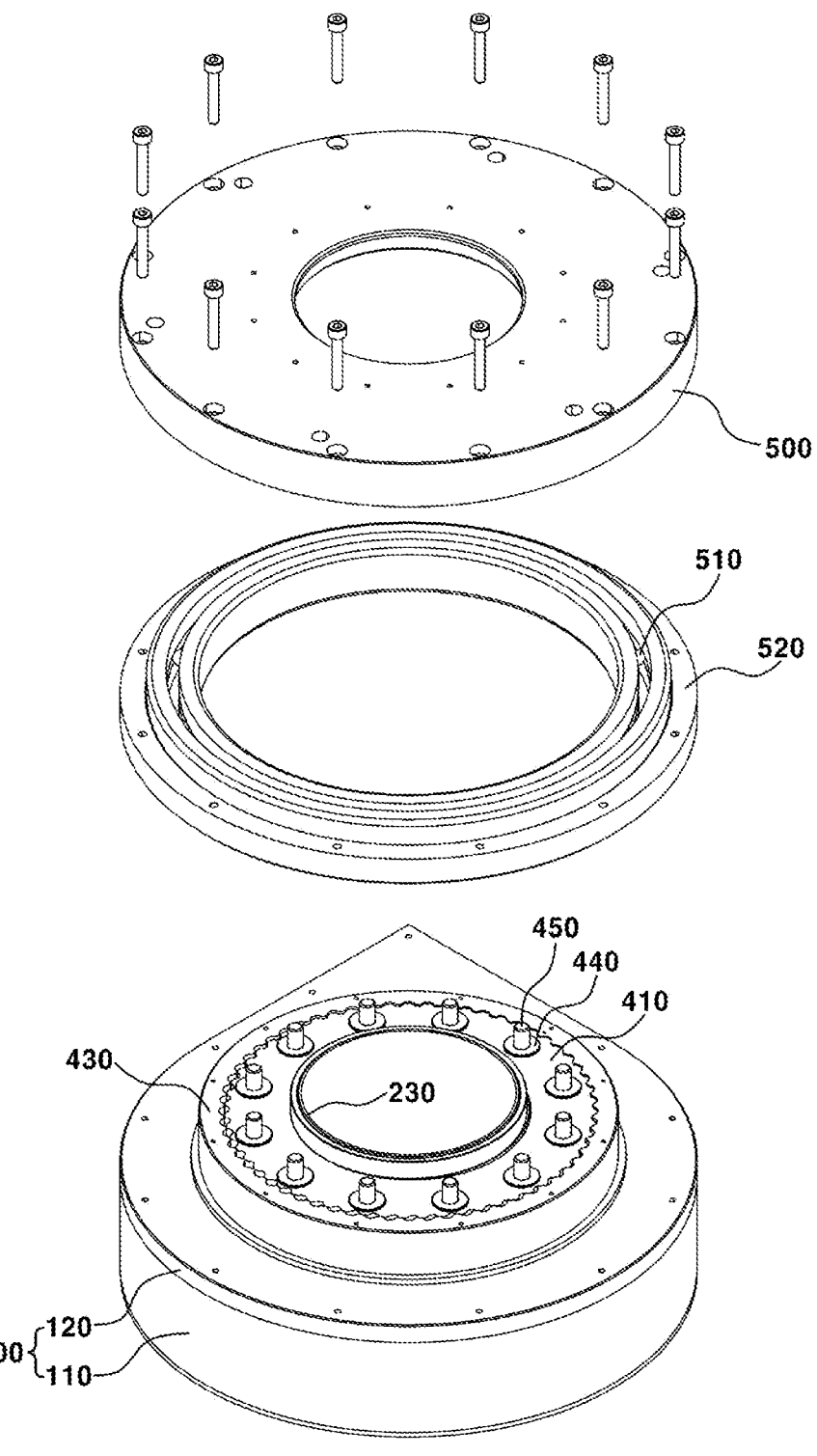
FIG. 13 is a perspective view showing a state in which a swivel plate configured to transmit rotational force to the height adjustment device and a seat cushion frame is assembled onto the second reduction gear device of the swivel device for the vehicle seat according to the present disclosure.
Figure 14:
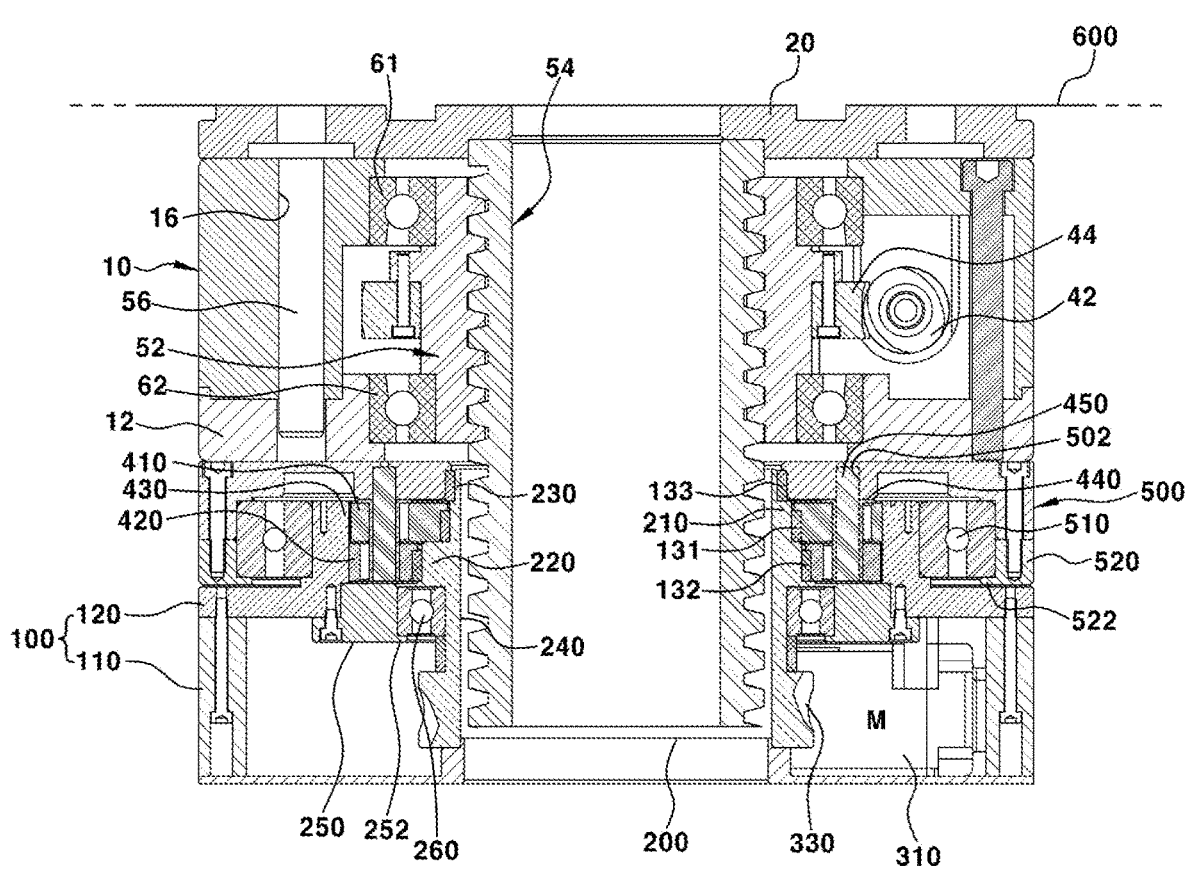

As shown in FIGS. 13 and 14, the swivel plate 500 is rotatably mounted on the output part of the second reduction gear device 400, and the fixed housing 10 of the height adjustment device is stacked on and coupled to the upper portion of the swivel plate 500.

Accordingly, when the swivel plate 500 is rotated by the output torque of the motor increased by the second reduction gear device 400, the fixed housing 10 and the lifting plate 20 are rotated, thereby swiveling the seat cushion frame 600 coupled to the lifting plate 20.

To this end, as shown in FIG. 14, the swivel plate 500 has a rotation transmission groove 502 formed on the lower surface of the swivel plate 500 and configured to allow the upper end of the rotation transmission pin 450 protruding upwards from the first external gear 410 of the second reduction gear device 400 to be inserted thereinto and coupled thereto.

Therefore, when the swivel plate 500 is stacked on the upper housing 120 and the first external gear 410 in a state where the rotation transmission pin 450 protrudes upwards from the first external gear 410, the rotation transmission pin 450 is inserted into and coupled to the rotation transmission groove 502 of the swivel plate 500. Accordingly, the swivel plate 500 is rotated by rotation of the rotation transmission pin 450, thereby making it possible to swivel the fixed housing 10 coupled to the swivel plate 500, the lifting plate 20 stacked on the fixed housing 10, and the seat cushion frame 600 coupled to the lifting plate 20.

In this case, when the swivel plate 500 is swiveled, the inner diameter portion of the swivel plate 500 toward the center of the lower surface of the swivel plate 500 is slidably in contact with the third sleeve bearing 133 inserted into the outer diameter portion of the circular part 230 of the eccentric shaft 200.

Meanwhile, the swivel plate 500 has a lower cover 520 further mounted on the lower surface of the edge of the swivel plate 500 and configured to rotatably contact the outer upper surface of the upper housing 120. Accordingly, the lower cover 520 has a function of not only eliminating vertical play between the swivel plate 500 and the upper housing 120 but also providing a mounting space for a first ball bearing 510 configured to guide rotation of the swivel plate 500.

Therefore, as shown in FIG. 14, the first ball bearing 510 configured to guide rotation of the swivel plate 500 and the lower cover 520 may be reliably mounted between the inner diameter portion of the swivel plate 500 and the lower cover 520 and the outer diameter portion of the upper housing 120.

Preferably, the lower inner diameter portion of the lower cover 520 and the lower outer diameter portion of the upper housing 120 are formed to be integrated with a first support end 522 configured to support the lower surface of the first ball bearing 510, thereby reliably fixing the position of the first ball bearing 510.

The eccentric shaft 200, the motor driving unit 300 configured to transmit power to the eccentric shaft 200, and the second reduction gear device 400 configured to increase output torque of the motor by receiving power from the eccentric shaft 200 are installed in the housing 100, and the swivel plate 500 coupled to the output part of the second reduction gear device 400 is stacked on and assembled with the housing 100, thereby enabling the housing 100 and the swivel plate 500 to be formed as a monopost of a seat in appearance.

In detail, as shown in FIG. 15, the housing 100, the swivel plate 500 rotatably stacked on the housing 100, the fixed housing 10 coupled to the swivel plate 500, and the lifting plate 20 stacked on the fixed housing 10 are sequentially stacked, thereby forming a monopost of a seat in appearance. Accordingly, it is possible not only to secure a sufficiently flattened space of a floor panel, but also to improve user convenience in the interior of the vehicle.

Hereinafter, a description will be given as to an operation flow of the swivel device according to the present disclosure having the above-described configuration.

First, rotational force of the second worm 320 according to driving of the second motor 310 is transmitted to the second worm wheel 330, thereby rotating the eccentric shaft 200 having the second worm wheel 330 mounted thereon.

At the same time, when the eccentric shaft 200 is rotated, the first eccentric part 210 and the second eccentric part 220 are eccentrically rotated.

In this case, the second reduction gear device 400 operates to increase output torque of the motor by eccentric rotation of the first eccentric part 210 and the second eccentric part 220.

To this end, the second external gear 420 is eccentrically rotated while being engaged with one part of the internal gear 430 by eccentric rotation of the second eccentric part 220, and simultaneously, the first external gear 410 is eccentrically rotated while being engaged with the other part of the internal gear 430 by eccentric rotation of the first eccentric part 210.

Preferably, when the eccentric shaft 200 is rotated once, the first external gear 410 is rotated by 1/the number of teeth of the first external gear, and simultaneously, the second external gear 420 is rotated by 1/the number of teeth of the second external gear.

Accordingly, when the eccentric shaft 200 is continuously rotated, the second external gear 420 is eccentrically rotated while being engaged with one part of the internal gear 430, and the first external gear 410 is eccentrically rotated while being engaged with the other part of the internal gear 430, thereby reliably increasing output torque of the second motor 310 to swivel a vehicle seat.

In this case, the output torque of the motor increased by the second reduction gear device 400 may be transmitted to the swivel plate 500 through the rotation transmission pin 450.

More specifically, since the rotation transmission pin 450 is in a state of being inserted into and coupled to the rotation transmission groove 502 of the swivel plate 500, the swivel plate 500 may be rotated by rotation of the rotation transmission pin 450.

Accordingly, the fixed housing 10 coupled to the swivel plate 500, the lifting plate 20 stacked on the fixed housing 10, and the seat cushion frame 600 coupled to the lifting plate 20 are rotated simultaneously by rotation of the swivel plate 500, thereby performing a swivel function of a vehicle seat.

In this manner, the seat may be easily swiveled to a desired position without interfering with peripheral parts for multilateral meetings and talks, relaxation and sleeping, and assistance in entering and exiting the vehicle in the limited interior space of the vehicle.

As is apparent from the above description, the present disclosure provides the following effects.

First, it is possible to reliably swivel a seat to a desired position without interfering with peripheral parts for multilateral meetings and conversations between occupants, relaxation and sleeping, and assistance in entering and exiting the vehicle in the limited interior space of the vehicle.

Secondly, a height adjustment device and a swivel device for the seat perform a monopost function, thereby making it possible not only to secure a sufficiently flattened space of a floor panel, but also to improve user convenience in the interior of the vehicle.

Third, a reduction gear device is coupled to an eccentric shaft of a motor, thereby enabling gears of the reduction gear device to reliably improve output torque of the motor to swivel the seat while being eccentrically rotated.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. A height adjustment device and a swivel device for a vehicle seat, the height adjustment device and the swivel device comprising:
    a fixed housing;
    a lifting plate stacked on the fixed housing so as to be movable upwards and downwards and coupled to a seat cushion frame;
    a lifting device mounted on the fixed housing and the lifting plate and configured to move the lifting plate upwards and downwards;
    a first motor mounted in the fixed housing;
    a first reduction gear device mounted between the first motor and the lifting device and configured to move the lifting device upwards and downwards; and
    the swivel device mounted between a bottom of the fixed housing and a seat track and configured to swivel the vehicle seat.

2. The height adjustment device and the swivel device of claim 1, wherein the first reduction gear device comprises:
    a first worm coupled to an output shaft of the first motor; and a first worm wheel mounted on an outer diameter surface of a lead nut of the lifting device and engaged with the first worm.

3. The height adjustment device and the swivel device of claim 1, wherein the lifting device comprises:

a lead nut disposed in the fixed housing so as to be rotatable in place;

a lead bolt having an upper end coupled to the lifting plate, wherein the lead bolt is inserted into and coupled to the lead nut so as to be movable upwards and downwards; and a plurality of guide bars coupled to a lower surface of the lifting plate and inserted into the fixed housing so as to be movable upwards and downwards.

4. The height adjustment device and the swivel device of claim 3, wherein the fixed housing has an opening hole disposed at a central portion of the fixed housing and configured to allow the lead bolt to move therethrough upwards and downwards.

5. The height adjustment device and the swivel device of claim 3, wherein a first bearing is mounted between an upper outer diameter surface of the lead nut and an inner diameter portion of the fixed housing, wherein the first bearing guides rotation of the lead nut in place.

6. The height adjustment device and the swivel device of claim 3, wherein a second bearing is mounted between a lower outer diameter surface of the lead nut and an inner diameter portion of the fixed housing, wherein the second bearing guides rotation of the lead nut in place.

7. The height adjustment device and the swivel device of claim 1, wherein the swivel device comprises:

a lower housing;

an upper housing stacked on and assembled to the lower housing;

an eccentric shaft rotatably disposed at a central portion of the lower housing and the upper housing;

a motor driving unit mounted between the lower housing and the eccentric shaft;

a second reduction gear device installed between the upper housing and the eccentric shaft; and a swivel plate having a lower portion rotatably mounted on an output part of the second reduction gear device and an upper portion coupled to the fixed housing.

8. The height adjustment device and the swivel device of claim 7, wherein the eccentric shaft comprises:

a cylindrical body having a hollow structure, wherein the cylindrical body allows a lead bolt of the lifting device to be inserted thereinto when the lead bolt moves downwards;

a circular part formed at an uppermost end of the cylindrical body;

a first eccentric part formed to be integrated with an outer diameter portion of the cylindrical body and located below the circular part; and a second eccentric part formed to be integrated with the outer diameter portion of the cylindrical body and located below the first eccentric part.

9. The height adjustment device and the swivel device of claim 8, wherein the first eccentric part has a first sleeve bearing inserted into an outer diameter portion of the first eccentric part, the second eccentric part has a second sleeve bearing inserted into an outer diameter portion of the second eccentric part, and the circular part has a third sleeve bearing inserted into an outer diameter portion of the circular part.

10. The height adjustment device and the swivel device of claim 7, wherein the motor driving unit comprises:

a second motor mounted in the lower housing;

a second worm mounted on an output shaft of the second motor; and a second worm wheel mounted on an outer diameter portion of a lower end of the eccentric shaft and engaged with the second worm.

11. The height adjustment device and the swivel device of claim 7, wherein the second reduction gear device comprises:

a first external gear inserted into and coupled to a first eccentric part of the eccentric shaft;

a second external gear inserted into and coupled to a second eccentric part of the eccentric shaft; and an internal gear formed on an inner diameter portion of the upper housing and engaged with the first external gear and the second external gear.

12. The height adjustment device and the swivel device of claim 11, wherein the first external gear inserted into and coupled to the first eccentric part and the second external gear inserted into and coupled to the second eccentric part are stacked and coupled eccentrically to each other so that a portion of the first external gear being engaged with the internal gear, and a portion of the second external gear being engaged with the internal gear, are different from each other.

13. The height adjustment device and the swivel device of claim 11, wherein the first external gear has a plurality of first coupling holes formed therein, and the second external gear has a plurality of second coupling holes formed therein, wherein the first coupling holes and the second coupling holes match each other in a vertical direction, and wherein the first coupling holes and the second coupling holes have hollow fixation pins respectively inserted thereinto and coupled thereto.

14. The height adjustment device and the swivel device of claim 13, wherein the hollow fixation pins have rotation transmission pins respectively inserted thereinto and coupled thereto, and the rotation transmission pins respectively have upper ends arranged so as to protrude upwards from the first external gear.

15. The height adjustment device and the swivel device of claim 11, wherein the upper housing has a ring-shaped support plate mounted on a lower surface of the upper housing and configured to support a bottom of the second external gear, and a second ball bearing is mounted between an outer diameter portion of the eccentric shaft and an inner diameter portion of the support plate, wherein the second ball bearing guides rotation of the eccentric shaft.

16. The height adjustment device and the swivel device of claim 7, wherein the swivel plate has a rotation transmission groove formed on a lower surface of the swivel plate and configured to allow an upper end of a rotation transmission pin to be inserted thereinto and coupled thereto, wherein the rotation transmission pin is formed to protrude upwards from a first external gear of the second reduction gear device.

17. The height adjustment device and the swivel device of claim 16, wherein the swivel plate has a lower cover mounted on the lower surface of an edge portion of the swivel plate and configured to rotatably contact an upper surface of the upper housing, and a first ball bearing is mounted between inner diameter portions of the swivel plate and the lower cover and an outer diameter portion of the upper housing, wherein the first ball bearing guides rotation of the swivel plate and rotation of the lower cover.

18. A vehicle comprising the height adjustment device and the swivel device of claim 1.

19. A height adjustment device and a swivel device for a vehicle seat, the height adjustment device and the swivel device comprising:

a fixed housing;

a lifting plate stacked on the fixed housing so as to be movable upwards and downwards and coupled to a seat cushion frame;

a lifting device mounted on the fixed housing and the lifting plate and configured to move the lifting plate upwards and downwards;

a first motor mounted in the fixed housing; and a first reduction gear device mounted between the first motor and the lifting device and configured to move the lifting device upwards and downwards.

20. The height adjustment device and the swivel device of claim 19, wherein the swivel device is configured to swivel the vehicle seat, the swivel device being mounted between a bottom of the fixed housing and a seat track.

\* \* \* \* \*